United States Patent [19]

McCusker

[11] Patent Number: 5,425,545
[45] Date of Patent: Jun. 20, 1995

[54] COMPREHENSIVE, PORTABLE, ASSEMBLABLE RECREATION STATION

[75] Inventor: Peter J. McCusker, 109 Soule La., Kennett Square, Pa. 19348

[73] Assignee: Peter J. McCusker, Kennett Square, Pa.

[21] Appl. No.: 227,625

[22] Filed: Apr. 14, 1994

[51] Int. Cl.6 ............................ B60F 5/00; B62B 3/02
[52] U.S. Cl. ...................... 280/30; 280/47.35; 296/26; 296/27
[58] Field of Search ............ 280/30, 35, 37, 639, 280/47.18, 47.35, 62; 62/258, 457.1; 296/26, 27

[56] References Cited

U.S. PATENT DOCUMENTS

| 2,603,500 | 7/1952 | Messier | 280/30 |
|---|---|---|---|
| 2,634,189 | 4/1953 | Hill | 280/47.18 X |
| 3,591,194 | 7/1971 | Vega | 62/457 |
| 3,633,324 | 1/1972 | Cuylits | 296/26 X |
| 4,581,902 | 4/1986 | Starck et al. | 62/258 |
| 4,631,877 | 12/1986 | Molodecki | 280/30 X |
| 5,092,615 | 3/1992 | Gregalis | 280/30 |
| 5,169,164 | 12/1992 | Bradford | 280/35 |
| 5,269,157 | 12/1993 | Ciminelli et al. | 62/457.7 |
| 5,285,656 | 2/1994 | Peters | 280/30 X |
| 5,306,029 | 4/1994 | Kaiser, II | 280/30 |
| 5,380,022 | 1/1995 | Dennis | 280/47.35 |

FOREIGN PATENT DOCUMENTS

| 1100891 | 3/1961 | Germany | 280/47.35 |
|---|---|---|---|
| 3446490 | 9/1985 | Germany | 296/26 |
| 2053812 | 2/1981 | United Kingdom | 280/47.35 |

Primary Examiner—Brian L. Johnson

[57] ABSTRACT

A utility comprehensive, compactly disassemblable, and easily reassembled, lightweight and easily transportable recreation station comprising a table bearing surface, canopy, and storage box having a comfort accoutrements compartment and a compartment for storage of the disassembled device.

17 Claims, 5 Drawing Sheets

COMPREHENSIVE, PORTABLE, ASSEMBLABLE RECREATION STATION

BACKGROUND OF THE INVENTION

1. Field of the Invention

The present invention relates to a device comprising a storage box and an easily assembled and disassembled recreation station of particular use at the beach and on picnics.

2. Prior Art

Prior art principally relates to ice chests that include only some of the features of the present invention. Representative of said ice chests are ones that comprise either a wheeled ice chest, a wheeled ice chest with chair and umbrella, or an unwheeled ice chest with table.

U.S. Pat. No. 5,169,164 to Bradford (1992) discloses an ice chest tote which permits easy wheeling of said ice chest to its destination. However, no recreation station is provided. U.S. Pat. No. 3,591,194 to Vega (1971) also discloses a wheeled ice chest; the storage section contains a plurality of compartments, but without a recreation station. U.S. Pat. No. 5,269,157 to Ciminelli et al. (1993) discloses a wheeled ice chest that incorporates a beach chair and support for an optional umbrella; no table is provided and simultaneous use of ice chest and chair are not possible, since the ice chest lid also is the chair seat. U.S. Pat. No. 4,581,902 to Starck et al. (1986) discloses a portable ice chest and auxiliary table; the recreational unit lacks both cover from the elements and wheels for easy transport.

Prior art, therefore, does not provide a comprehensive, portable, adjustable, quickly and easily assembled and disassembled recreation station having storage space.

Thus there is need for a storage box with transport means which fits readily into the trunk of an automobile and which converts into a comprehensive, portable, lightweight, incrementally adjustable, quickly and easily assemblable and disassemblable recreation station which includes a storage space, table, and canopy and that permits simultaneous access to the storage space, table, and canopy of particular use at the beach and on picnics.

SUMMARY OF THE INVENTION

The present invention relates to a device comprising a storage box and a recreation station, particularly useful for picnic and beach outings. The storage box comprises transport means, a comfort accoutrements section, and a components storage section. Associated with the storage box is a recreation station comprising a table and canopy that are readily assembled and disassembled. When disassembled, all components of the recreation station are storable in the storage box which is portable, small enough to fit in an automobile trunk, and light enough to be easily lifted.

DESCRIPTION OF THE INVENTION

The present invention relates to a device comprising a storage box and a recreation station that is comprehensive, compact, disassemblable and reassemblable, lightweight and easily transportable.

The storage box comprises (i) at least two compartments including a comfort accoutrements section having a lid thereto that is accessible when the recreation station is assembled and a components storage section that accommodates disassembled components of said device; and (ii) means located toward the upper and the lower area of the outer wall of said storage box to removably affix to said storage box vertical support member units; and said recreation station having (i) horizontal support members and said vertical support member units that position a table bearing surface and a canopy, said horizontal support members and said vertical support member units storable in said storage box; (ii) said table bearing surface compactable to be stored in said storage box and means to removably affix said table bearing surface to said horizontal support members and said vertical support member units; and (iii) said canopy above said table bearing surface compactable to be stored in said storage box and means to removably affix said canopy to said vertical support member units.

BRIEF DESCRIPTION OF THE DRAWING FIGURES

For a more detailed description of the preferred embodiments of the device of the present invention, reference is made to the drawings in which.

The structural components of the device of the present invention are made of lightweight, rigid material, preferably lightweight, rigid, strong, thin plastic. The pulls, tie downs, fasteners, and canopy preferentially are made of stretchable, light weight, sun and water resistant material.

DETAILED DESCRIPTION OF THE PREFERRED EMBODIMENTS

Figures 1, 2:
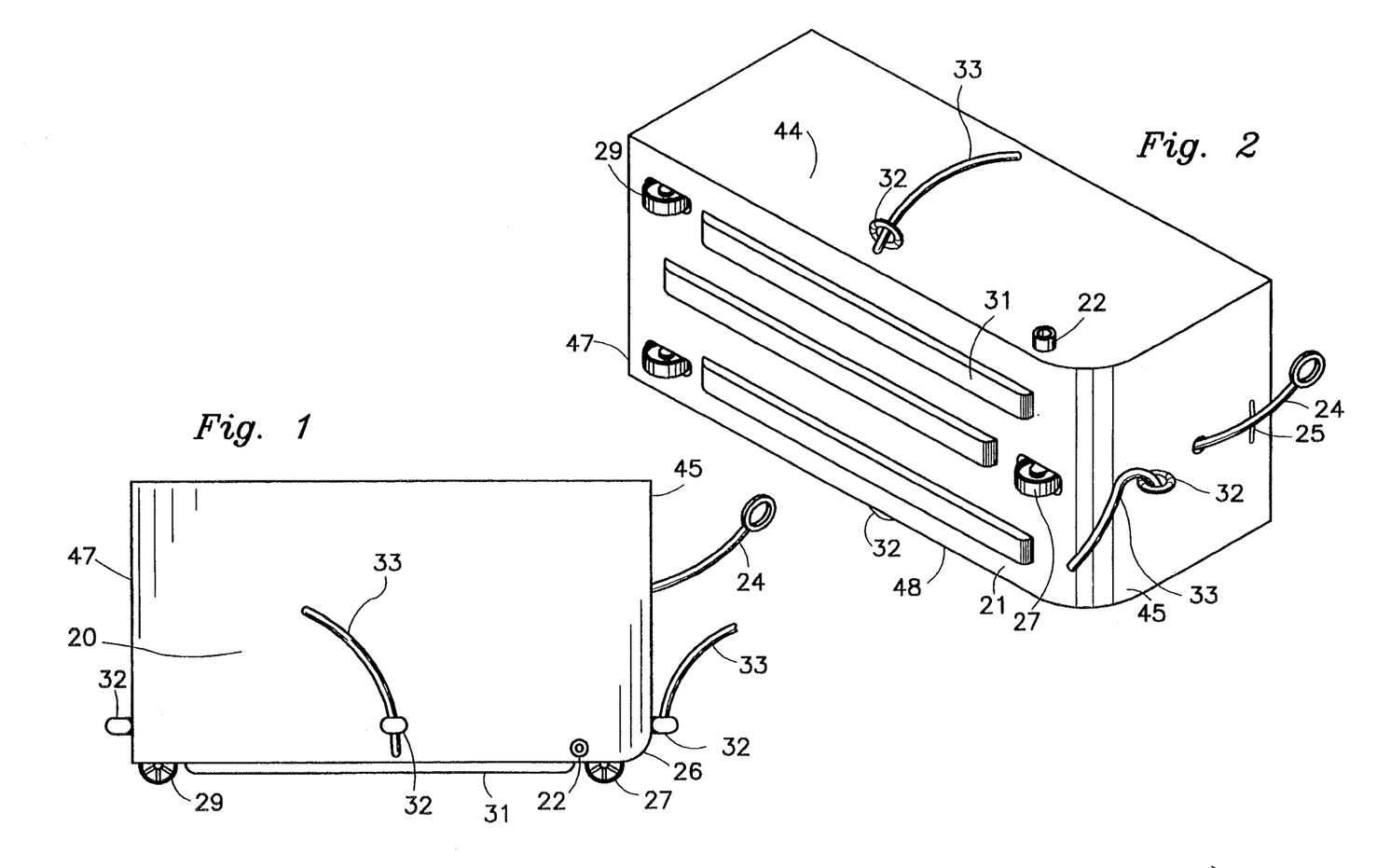
FIG. 1 is a side view of the storage box.
FIG. 2 is a plan view of the underside of the storage box.

Referring to FIGS. 1 and 2, storage box 20 preferably has one or more means for transport, such as lift devices 25 on the ends of storage box 20; a pull device 24 attached to the front of storage box 20; a front end convexity 26 of box bottom 21 smoothly arching upward; runners 31 molded or otherwise affixed to box bottom 21 parallel to the long axis of storage box 20; plugable drain hole 22; and lockable wheels 27, 29 on box bottom 21.

Wheels 27, 29 preferably are lockable, given the desirability of stably transporting storage box 20 in the trunk of an automobile. Three wheels are most preferred, two nonsteerable wheels 29 at the back end of storage box 20, desirably extending beyond the back of storage box 20, and one steerable wheel 27 toward the front of storage box 20 approximately in the middle of box bottom 21 about where box bottom 21 begins to arc convexedly upward 26. Steerable wheel 27 is a caster mounted on a vertical pin 28 free to allow said caster to rotate 360 degrees. Desirably, wheels 27, 29 are mounted to extend only slightly below box bottom 21, rear nonsteerable wheels 29 being mounted at the sides of storage box 20 or in wheel wells in box bottom 21. Steerable wheel 27 is mounted in a wheel well 30 or affixed to front end wall 45 at the front of storage box 20.

Storage box 20 has tie down eyelets 32 and removably affixed tie downs 33 to secure folded chairs, blankets, and other such items to the top of storage box 20 during storage and transport. Storage box 20 desirably has conventional plugable drain hole 22 located in comfort accoutrements section 49 at or near the bottom of comfort accoutrements outer wall 43. For ease of removing table bearing surface 40 during assembly, leaves retaining wall 34 has retaining wall notch 35 as depicted in the current embodiment or other devices such as grooves at the ends of the long axis of storage box 20 through the front end wall 45 and rear end wall 47 for gripping table bearing surface 40.

Referring to FIGS. 1 to 15, storage box 20 is strong and rigid having a bottom and vertical peripheral walls, said peripheral walls comprising components storage section outer wall 48, comfort accoutrements outer wall 44, front end wall 45 and rear end wall 47. Storage box 20 is divided longitudinally by dividing wall 43 into comfort accoutrements section 50 for food and recreational supplies and components storage section 52 that stores disassembled device parts and positions box-contained vertical support member units 61 when the recreation station is assembled.

Preferably, comfort accoutrements section 50 is lined with insulation 23 and covered with insulated comfort accoutrements section lid 49. Lid hinge 51 is affixed to dividing wall 43 at the inner side of comfort accoutrements section 50 to enable unobstructed accessibility to comfort accoutrements section 50 when the recreation station is assembled. When comfort accoutrements section lid 49 is closed, said lid 49 rests substantially parallel to box bottom 21 on knee 46 of comfort accoutrements section outer wall 44.

Located horizontally, adjacent to components storage section outer wall 48 and dividing wall 43 is upper support guide 53 which rests on upper support guide ledge 55 and lower support guide 56 which rests on box bottom 21. Support member guides 53, 56 are means to removably affix recreation station box-contained vertical support member units 63 to storage box 20 and maintain them stably vertical. In this embodiment, support member guides 53, 56 are two rectangular boards that fit snugly in components storage section 52. Each board has two holes 54, 57 therethrough toward each board end to engage vertical support member units 62 within components storage section 52 when the recreation station is assembled.

Four recreation station vertical support member units 62 are provided, namely two box-contained vertical support member units and two box-remote vertical support member units. Each vertical support member unit is comprised of the coaxial union of an upper vertical support member 58 and a lower vertical support member 60. Each upper vertical support member 58 has a threaded apex 59 which in the assembled recreation station passes through canopy extender 74 at canopy extender hole 75 and is secured by locknut 76. Lower vertical support member 60 and upper vertical support member 58 each has a vertical row of several holes 61 at about two inch intervals. When upper vertical support member 58 and lower 60 vertical support member, conjointly forming each vertical support member unit 62, are coaxially adjusted to the desired height, the holes 61 of the respective upper vertical support member 58 and lower vertical support member 60 are aligned, and bolt 68 is inserted horizontally therethrough and secured with wing nut 67, thereby removably fixing the desired vertical support member unit 62 height.

For box-contained vertical support member units 62, box bottom 21 supports verticality and minimizes their penetration into the supporting ground surface. For box-remote vertical support member units 62, feet 69 support verticality and minimize penetration of vertical support member units 62 into the supporting ground surface. In this embodiment, feet 69 are required only for box-remote vertical support member units 62; if the box-contained vertical support member units 62 were not box-contained but rather on the external side of components storage section outer wall 48, said box-contained vertical support member units 62 would be removably attached to the external side of components storage section outer wall 48 or supported by additional freestanding feet 69.

Horizontal support member 65 in this embodiment is a rectangular board supporting table bearing surface 40. Horizontal support member 65 is removably affixed horizontally, one to the pair of recreation station box-contained vertical support member units 62 and one to the pair of box-remote vertical support member units 62. Bolts 68 are inserted horizontally into aligned holes 61 in vertical support member units 62 and holes 66 in horizontal support members 65 and secured with wing nuts 67, removably affixing the horizontal support members 65 to the vertical support member units 62.

Table bearing surface 40, as shown, is made up as follows:

Two leaf hinges 39, one over the top side of table bearing surface 40 attached to the right end leaf 37 and the center leaf 36 and the other leaf hinge 39 on the bottom side of table bearing surface 40 attached to the left end leaf 38 and the center leaf 36 maintain the leaves 36, 37, 38 in edge to edge position along their longitudinal axis. This hinged table bearing surface 40 arrangement facilitates handling during assembly and disassembly and maintains the alignment and continuity of leaves 36, 37, 38. Table bearing surface 40 has four holes 41, two toward the outer edge of each outer leaf 37, 38 through which coaxially are inserted at their bottom each of the four vertical support member units 62 when the recreation station is assembled.

Table bearing surface 40 rests on horizontal support members 65 which support table bearing surface 40 horizontally and vertically. Positioning of said table bearing surface 40 is accomplished during assembly by removably affixing horizontal support members 65 to vertical support member units 62 to achieve the desired height and position of table bearing surface 40.

Figure 3:
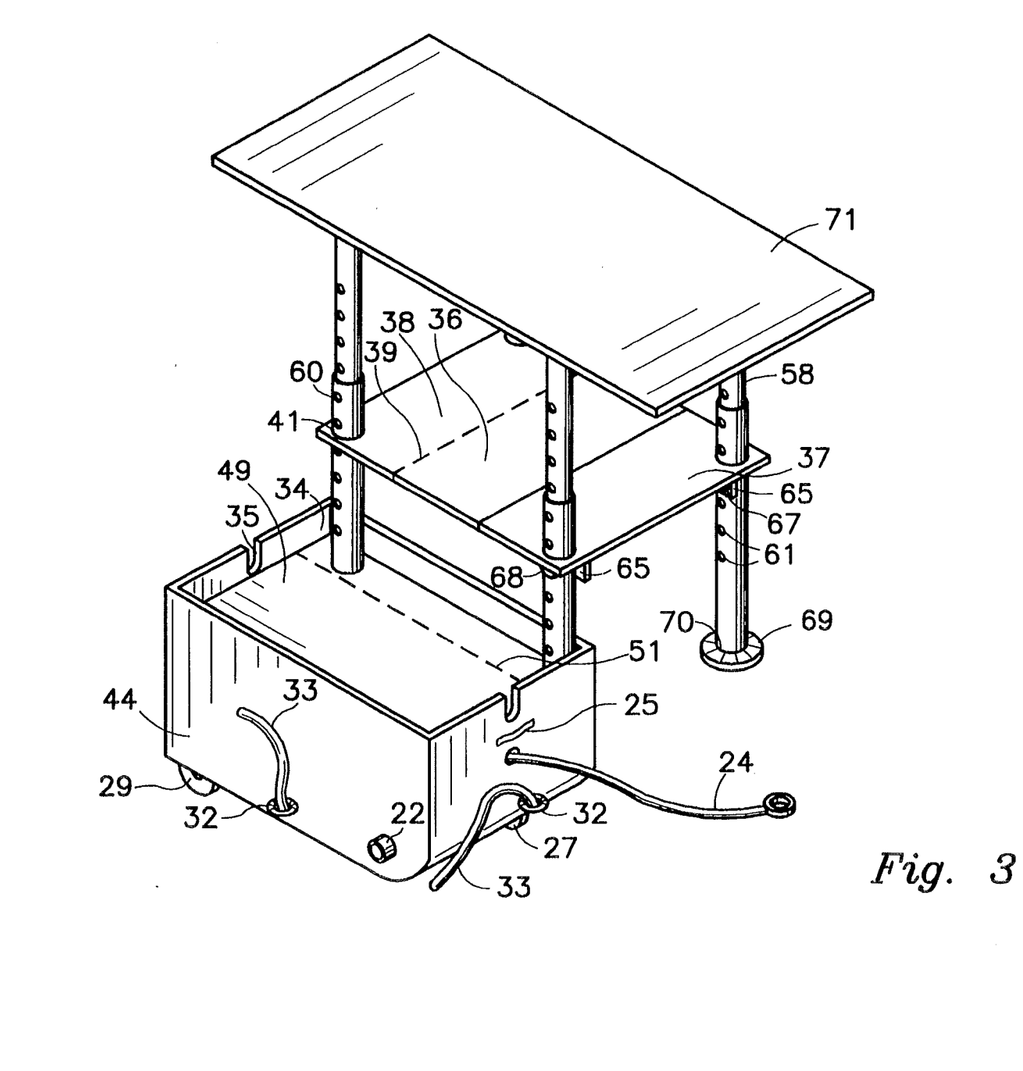
FIG. 3 is a perspective view of the assembled device.
Figure 4:
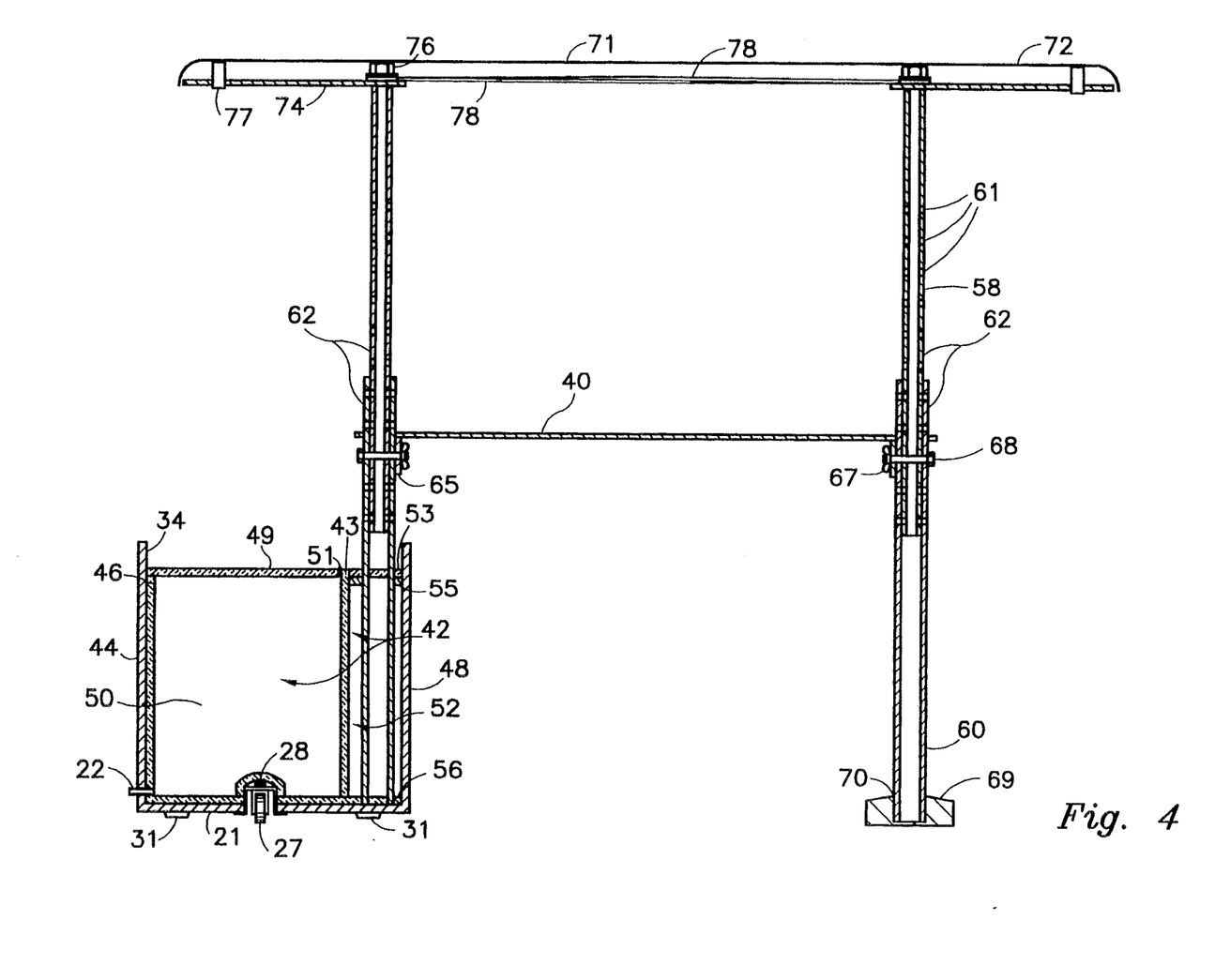
FIG. 4 is a sectional elevation cross section view of the device looking toward the front end of the storage box cut through recreation station support members.
Figure 6:
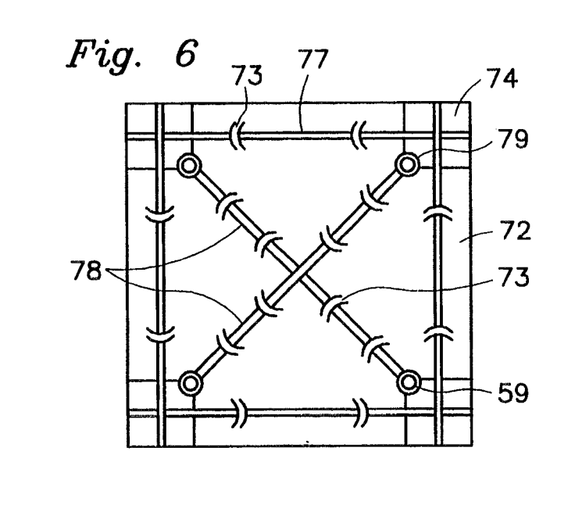
FIG. 6 is a plan view of the underside of the assembled canopy.
Figure 7:
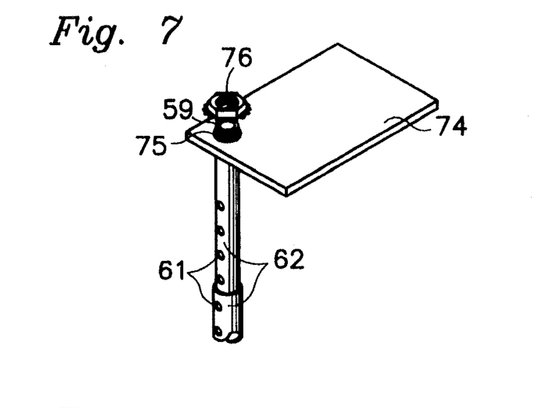
FIG. 7 is a perspective view of a vertical support member unit with assembled canopy extender.
Figures 8, 9:
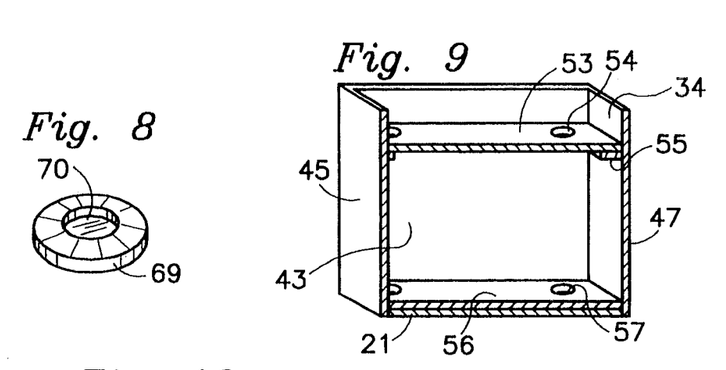
FIG. 8 is a side view of a foot.
FIG. 9 is an elevation cross section view of the components storage section of the storage box.
Figure 10:
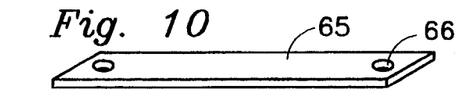
FIG. 10 is a perspective view of a horizontal support member.
Figures 11, 12, 13, 14:
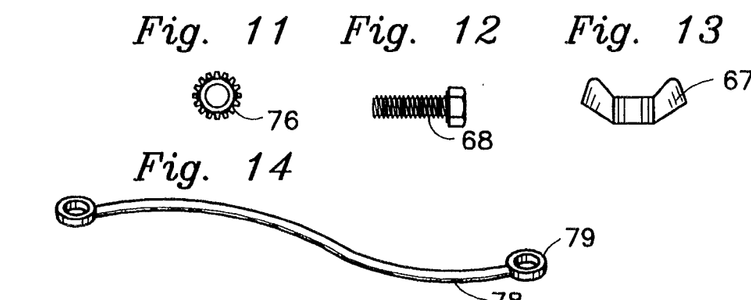
FIG. 11 is a plan view of a lock nut.
FIG. 12 is a plan view of a bolt.
FIG. 13 is a plan view of a wing nut.
FIG. 14 is a plan view of a diagonal fastener.
Figure 15:
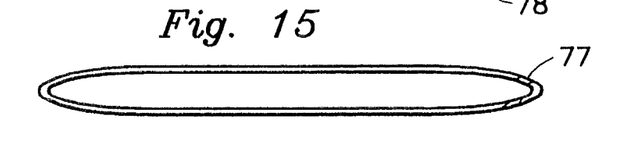
FIG. 15 is a plan view of a perimeter fastener.

As FIGS. 3, 4, and 6 illustrate, above table bearing surface 40 is canopy 71 supported at its four corners by canopy extenders 74 secured through canopy extender holes 75 by locknuts 76 to threaded apexes of upper vertical support members 59. Canopy 71 support also is provided along canopy 71 perimeter by perimeter fasteners 77 along canopy 71 perimeter and across canopy 71 central portion by diagonal fasteners 78 positioned diagonally across the central portion of canopy 71.

Canopy 71 is removably affixed to canopy extenders 74 which, in turn, are removably affixed to upper vertical support members 58 which comprise the upper section of vertical support member units 62. Positioning of upper vertical support members 58 by reason of vertical support member units' 62 removable attachment to horizontal support members 65, therefore, removably affixes the position of the removably attached canopy 71.

FIGS. 6 to 15, respectively, are views of the underside of the assembled canopy 71, a vertical support member unit 62 with assembled canopy extender 74, a foot 69, the components storage section 52, a horizontal support member 65, a lock nut 76, a bolt 68, a wing nut 67, a diagonal fastener 78, and a perimeter fastener 77. FIGS. 3, 4, and 6, show that canopy extenders 74 and canopy 71 preferentially extend in at least one direction beyond the vertical edge plane of the underlying table bearing surface 40.

In the embodiment of the drawings, canopy 71 has extension sections 72 on all four sides of canopy 71, and all four sides are identical. Each canopy extender 74 is removably affixed coaxially to one of each threaded apexes 59 of upper vertical support member at the point of canopy extender hole 75 and secured by locknut 76. Canopy 71 then is placed over canopy extenders 74 such that canopy 71 overlaps the underlying table bearing surface 40 at the point of the canopy extenders 74. Canopy extenders 74 positioned parallel to each other at the apexes 59 of upper vertical support members support canopy 71 at its four corners. The inner anchoring end of square-shaped canopy extender 74 is secured through canopy extender hole 75 by locknut 76 to threaded apex 59 of upper vertical support member.

Canopy 71 is held in place by canopy fasteners 77, 78 which are removably threaded through canopy loops 73 along the canopy 71 perimeter and diagonally across canopy 71 center. Canopy perimeter fastener 77 and diagonal fastener 78 in this embodiment are elastic belts removably affixed to canopy 71 and to apex 59 of upper vertical support member and canopy extender 74.

On the perimeter of one side of canopy 71, canopy perimeter fastener 77 first is wrapped over and then under a canopy extender 74 and stretched along the underside perimeter of canopy 71 and removably affixed therewith by elastic tension in a belt-like fashion to another canopy extender 74 on the same side of canopy 71, providing taut fit of canopy 71 to canopy extenders 74 during use of the assembled recreation station and permitting easy detachment of the perimeter fasteners 77 during disassembly of the recreation station.

Within the central portion of canopy 71, two diagonal fasteners 78 are removably affixed to the central portion of canopy 71 in an x configuration. Each diagonal fastener 78 is aligned on a plane with the threaded apexes 59 of upper vertical support members located diagonally from each other. The endmost parts of diagonal fastener 78, which have looped endpoints 79, terminate short of the apexes 59 of upper vertical support members and are stretched taut and removably affixed in a bungie cord-like fashion to the apexs of two diagonally opposed upper vertical support members, stabilizing upper vertical support members 58 and providing a supporting surface for the central section of the overhanging canopy 71.

Figure 5:
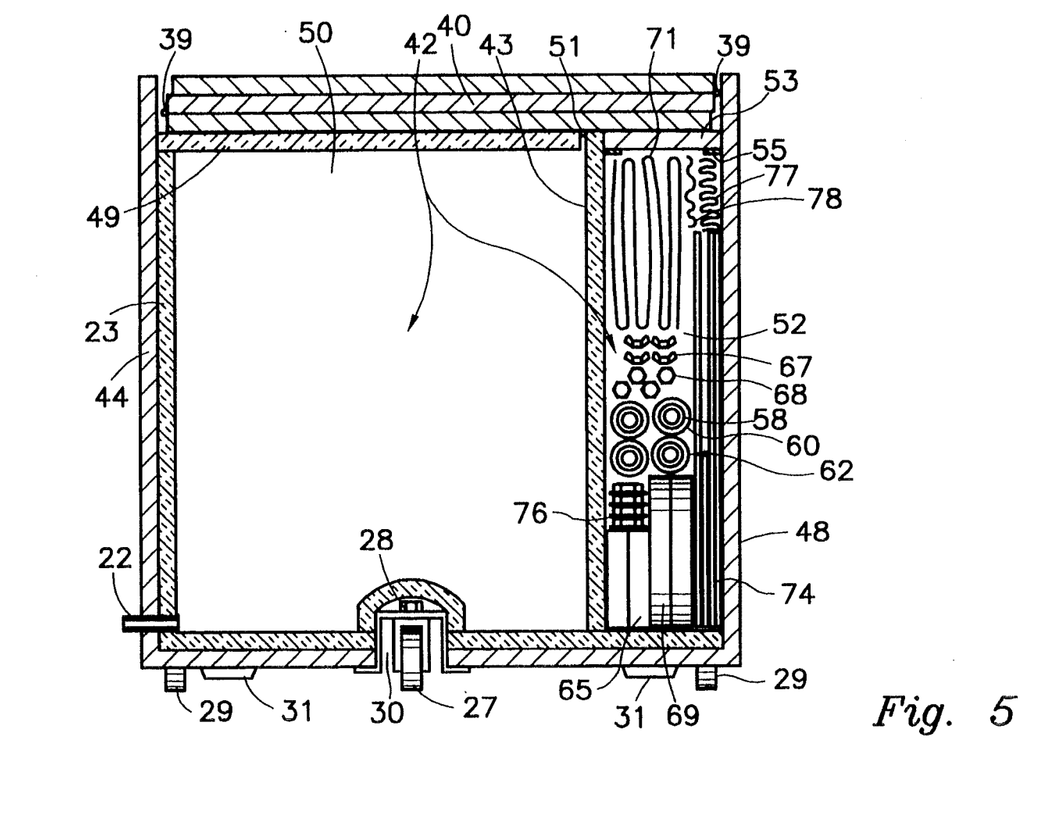
FIG. 5 is a vertical cross section view of the device when the recreation station is disassembled and stored in the storage box.

Referring to FIG. 5, when the recreation station is disassembled, all components parts of the device fit in components storage section 52, except for table bearing surface 40. Table bearing surface 40 when stored fits snugly in its folded state within the perimeter of the leaves' retaining wall 34 resting substantially parallel to box bottom 21 on upper support guide 53 and on comfort accoutrements section lid 49.

The disassembled device is a lightweight storage box 20 about 16"×16"×36". When assembled, the recreation station is of adjustable height with table bearing surface 40 capable of height adjustably ranging from about 16" to about 36" from the supporting ground surface and with canopy 71 adjustably ranging from about 3" to about 33" above table bearing surface 40. The assembled recreation station is about 36" wide and about 48" long.

As illustrated in FIGS. 3 to 15, the recreation station is assembled from storage box 20 as follows: Table bearing surface 40 is removed from its stored position. Upper support guide 53 is removed and all vertical support members 58 and 60, feet 69, horizontal support members 65, bolts 68, wing nuts 67, lock nuts 76, canopy extenders 74, perimeter fasteners 77, diagonal fasteners 78, and canopy 71 are removed from component storage section 52. Upper support guide 53 is returned to its position at the top of storage section 52. Upper vertical support members 58 with their threaded apexes 59 upward are inserted at their bottom, nonthreaded end coaxially into the upper end of lower vertical support members 60 thus forming vertical support member units 62. Each vertical support member unit 62 is coaxially inserted at its bottom into an upper support guide hole 54 down through lower support guide hole 57 thus maintaining box-contained vertical member support units 62 in the vertical position.

At the box-remote end of the recreation station remote from the components storage section 52, a similar process occurs. Upper vertical support members 58 are inserted at their bottom, nonthreaded end coaxially into the upper end of the lower vertical support members 60 thus forming vertical support member units 62. Each such vertical support member unit 62 is coaxially inserted at its bottom into foot holes 70 of feet 69, enabling vertical orientation of the vertical member support units 62 that are at the end of the recreation station that is remote from components storage section 52.

Box-contained upper vertical support members 63 then are adjusted to their desired height to maintain table bearing surface 40 and canopy 71 essentially parallel to the supporting ground surface. Holes 61 of upper vertical support member 58 and holes 61 of lower vertical support member 60 of each vertical support member unit 62 are aligned at the desired level and one horizontal support member 65 is bolted horizontally to each pair of vertical support member units 62 of box-contained vertical support member units 63 fixing the position of box-contained vertical support member units 63.

Next, at the box-remote end of the recreation station an identical process occurs with another horizontal support member 65 being bolted horizontally into the pair of box-remote vertical support member units 64. Thus, the top, supporting surface of the bolted horizontal support members 65 at both the box-contained and box-remote sections are essentially in the same horizontal plane and essentially parallel to each other so as to maintain the to-be-attached table bearing surface 40 essentially parallel to the supporting ground surface.

At this point table bearing surface 40 is unfolded and held above the apexes of upper vertical support members 59 with the long axis of leaf hinges 39 perpendicular to the long axis of horizontal support members 65. After holes 41 at the four corners of table bearing surface 40 have been aligned with apexes of vertical support members 59, table bearing surface 40 is lowered over upper vertical support members 58 coming to rest on horizontal support members 65. Here table bearing surface 40 is supported and forms the stationary table bearing surface 40 of the recreation station.

Next, each of the four canopy extenders 74 is removably affixed coaxially to the threaded apex 59 of one of the four upper vertical support members through canopy extender hole 75 and secured by locknut 76. Canopy 71 then is placed over canopy extenders 74 such that canopy 71 overlaps the underlying table bearing surface 40. Canopy 71 is held in place by elastic canopy fasteners 77, 78 which are removably threaded through canopy loops 73 along the canopy 71 perimeter and diagonally across the canopy 71 center.

Along each side of the perimeter of canopy 71, after four perimeter fasteners 77 have been removably threaded to canopy 71 through canopy loops 73, canopy 71 is removably affixed to canopy extenders 74 as follows: One perimeter fastener 77 is held between two canopy extenders 74 diametrically opposite each other on one side of canopy 71. The ends of perimeter fastener 77 are stretched and put over said canopy extenders 74. Each end of perimeter fastener 77 wraps over and under the canopy extender 74 toward which said perimeter fastener 77 end had been stretched. As a result, half of the stretched perimeter fastener 77 is along the underside of canopy 71 and half is along the underside of canopy extender 74 in a belt-like fashion, removably affixing canopy 71 to canopy extenders 74 by elastic tension providing taut fit of canopy 71 to canopy extenders 74 and providing a supporting surface for overhanging canopy 71. The aforementioned procedure is repeated along each side of the perimeter of canopy 71 so that all four sides of canopy 71 have a perimeter fastener 77 removably affixed to canopy 71.

Along the central portion of canopy 71, after two diagonal fasteners 78 have been removably threaded through canopy loops 73 diagonally across the central portion of canopy 71, canopy 71 is removably affixed to canopy extenders 74 as follows: Diagonal fastener 78 is held between two canopy extenders 74 located diagonally from each other. The unstretched, looped endpoints 79 of diagonal fastener 78 terminate short of the apexes 59 of upper vertical support members. The looped 79 ends of diagonal fasteners 78 are stretched in diametrically opposite directions toward diagonally positioned canopy extenders 74 diametrically opposite to each other across the central portion of the recreation station. Each diagonal fastener loop 79 of diagonal fastener 78 is removably attached to an apex 59 of an upper vertical support member diagonally positioned from each other. As a result, diagonal fastener 78 stretches across the underside of canopy 71 removably affixing canopy 71 to canopy extenders 74 by elastic tension in a bungie cord-like fashion providing taut fit of canopy 71 to canopy extenders 74 and providing a supporting surface for overhanging canopy 71. The aforementioned procedure is repeated across the other central portion of canopy 71 so that both central portions of canopy 71 have a diagonal fastener 78 removably affixed to canopy 71.

Many obvious departures can be made from the specific embodiments shown in the drawings: The comfort accoutrements section lid 49 as shown rests when closed on the knee of comfort accoutrements outer wall 46. If desired, the comfort accoutrements section lid 49 can rest on a ledge appropriately located to maintain said lid 49 horizontal to box bottom 21 when closed. Instead of being hinged, the comfort accoutrements section lid 49 can be otherwise pivotally mounted or mounted on end pieces or pins in position to open and close.

Table bearing surface 40 can be any compactable rigid, storable surface. Instead of leaves 36, 37, 38 as shown, interlocking or telescoping unitary structures can be used. Any means suitable for maintaining edge to edge attachment or spacing of the leaves may be used. The drawings show two full length piano hinges 39, but other devices such as a plurality of hinges, fitting grooves and tabs, or strapping may be used.

Rather than using coaxially fitted vertical support members 58, 60 with holes 61 aligned and bolted 68 through to set table bearing surface 40 and canopy 71 heights, the vertical support members 58, 60 can have a series of parallel ledges. In such an embodiment, table bearing surface 40 and canopy 71 can be removably affixed to parallel positioned ledges as desired.

The horizontal support member 65 as shown is a rectangular board, as is preferred. However, horizontal support can be through any means that stably positions table bearing surface 60 horizontally when assembled. For instance, horizontal support member 65 can be eliminated in favor of direct removable attachment of table bearing surface 40 to vertical support members 58, 60. This, for instance, can be done by using slidable bolts incorporated into the ends of table bearing surface 40. Such bolts would be inserted horizontally into vertical support member unit holes 61 at the desired level and removably affixed thereto.

Canopy extenders 74 which support the canopy extension sections 72 can be of any convenient form. For ease of storage and assembly, they may be hollow, nested one inside the other. Instead of being square-shaped and fitting into the upper vertical support member 58, canopy extender 74 may take many forms and be attached by other devices such as by clamps that removably affix to upper vertical support members 58. Canopy extenders 74 also can be rods that hook into upper vertical support members 58. Alternatively, horizontal and vertical rods can be used to form a conventional canopy 71 support understructure such as is commonly used to support a canopy on a building. This arrangement can be used in lieu of or in addition to the canopy extender 74 system.

Canopy 71 may be any conventional strong material such as fabric or plastic. Preferably the material is waterproof, lightweight and to some extent capable of blocking sunlight passage. It must be capable of being compacted into a small enough volume to fit during storage into components storage section 52 along with the other components of the device. Canopy 71 may be completely horizontal or may have peripheral downward extensions which add shade area and which may be decorated.

Other equivalents are obvious to one skilled in the art. For instance, rather than incorporating insulation 23 into the comfort accoutrements section walls, uninsulated walls may be used with a removable insulation insert being employed. Instead of using perimeter fasteners 77 and diagonal fasteners 78, the canopy 71 fastener system could be incorporated into canopy 71 such as in a manner similar to a fitted bedsheet attachment. In such an embodiment, canopy 71 can be removably affixed to canopy extenders 74 by elastic tension of the fitted-sheet-like-canopy 71 on the canopy extenders 74. Likewise, instead of a canopy 71, an umbrella can be removably affixed to the recreation station, as by inserting the umbrella through a hole in table bearing surface 40.

Thus, it is seen that the device of the present invention is comprehensive in utility, portable, assemblable and disassemblable. When the device is disassembled and stored, the storage box 20 fits readily into an automobile trunk and is lightweight enough to be easily lifted. The storage box 20 stores and easily transports not only all of the components necessary for assembly of the complete device but also such comfort accoutrements as foodstuffs, ice, books, balls, and lotions. Other items to be used out-of-doors, such as portable beach or park chairs and blankets also are stored and transported by the storage box 20 by affixing them to the storage box 20 via tie downs 33. So constituted, the entire device assemblage can be rolled or slid easily to its destination over solid or loose terrain such as pavement or sand, respectively, by reason of its wheels 27, 29, front edge convexity 26 and runnered box bottom 21.

The storage box 20 readily is transformed into the recreation station by assembling the table bearing surface 40 and canopy 71. The resulting device provides a fully outfitted work area sheltered from the elements and large enough for more than one person. The device allows simultaneous, independent access to the comfort accoutrements section 50 of the storage box 20 and to the table bearing surface 40 and canopy 71.

Although the description above contains many embodiments, these should not be construed as limiting the scope of this invention but merely as providing illustrations of some of the presently preferred embodiments. For instance, as noted earlier, the extenders can assume other shapes and methods of attachment, and the hinges of the table leaves can be replaced by interlocking grooves and tabs. Thus, the scope of this invention should be determined by the appended claims and their legal equivalents rather than by the examples given.

What is claimed:

1. A disassemblable and reassemblable recreation station device comprising:
   (a) a storage box comprising a bottom and vertical peripheral walls and at least two compartments, including a comfort accoutrements section having a lid attached thereto that is accessible and openable when said device is assembled, and a components storage section that accommodates disassembled components of said device;
   (b) box-contained and box-remote vertical support member units:
   (c) horizontal support means affixable to both said vertical support member units, which horizontal support means and vertical support member units position a table bearing surface and a canopy;
   (d) means to removably position vertically said vertical member support units, said box-contained vertical member support units being attached adjacent to said wall of said box and said box-remote members being positionable remote from said box;
   (e) a table bearing surface supported by said horizontal support means and both vertical support member units;
   (f) a canopy affixable to vertical support members of said vertical support member units;
   (g) means to removably affix said canopy to said vertical support members above said table bearing surface; said vertical support member units, horizontal support means, table bearing surface, and canopy having means for collapsing so as to be storable in said storage box.

2. The device of claim 1 wherein said comfort accoutrements section and said lid are insulated.

3. The device of claim 1 comprising transport means affixed to said storage box.

4. The device of claim 1 wherein said table bearing surface comprises a plurality of leaves in engagement edge to edge.

5. The device of claim 1 wherein said table bearing surface comprises a plurality of collapsible sections that compact to a size to be stored in said storage box.

6. The device of claim 1 wherein said canopy when connected extends in at least one direction beyond a vertical edge plane of said table bearing surface.

7. The device of claim 1 comprising means to minimize penetration of said vertical support member units into a supporting surface.

8. The device of claim 1 comprising at least two said vertical support member units.

9. The device of claim 1 wherein at least one said vertical support member unit is removably affixed to said storage box.

10. The device of claim 1 wherein at least one said vertical support member unit is removably affixed inside said storage box and said storage box minimizes penetration of said vertical support member unit into a supporting surface.

11. The device of claim 1 wherein at least one said vertical support member unit is removably affixed to the wall of said storage box.

12. The device of claim 1 wherein at least one said vertical support member unit is removably affixed to a foot outside said storage box and said foot minimizes penetration of said vertical support member into a supporting surface.

13. The device of claim 1 wherein said vertical support member unit comprises a plurality of sections of upwardly decreased coaxial cross-section areas so that the upper section can compact coaxially into the lower section for storage in said storage box.

14. The device of claim 1 comprising canopy support means having canopy extenders removably affixed to said vertical support members.

15. The device of claim 1 comprising canopy extenders capable of supporting said canopy beyond a vertical peripheral plane of said table bearing surface and removably affixable to said canopy.

16. The device of claim 1 comprising at least one perimeter fastener removably affixed to said canopy and to canopy extenders that removably affix said canopy to canopy support means.

17. The device of claim 1 comprising at least one diagonal fastener removably affixed to said canopy and to canopy extenders that removably affix said canopy to canopy support means.

* * * * *